Dec. 4, 1934.  B. G. CARLSON  1,982,636
AIR DRIVEN GYRO VERTICAL
Filed Feb. 10, 1931  2 Sheets-Sheet 1
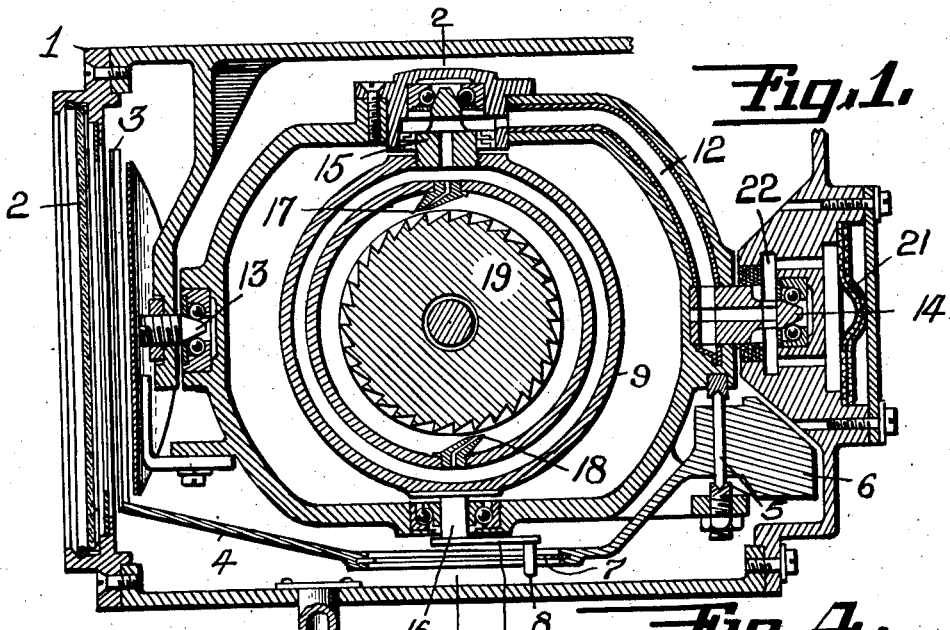
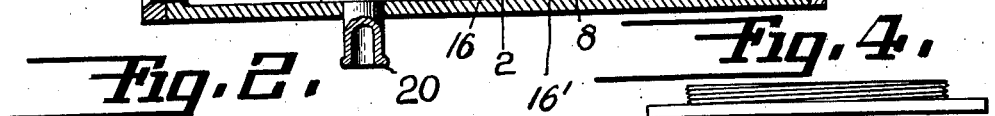
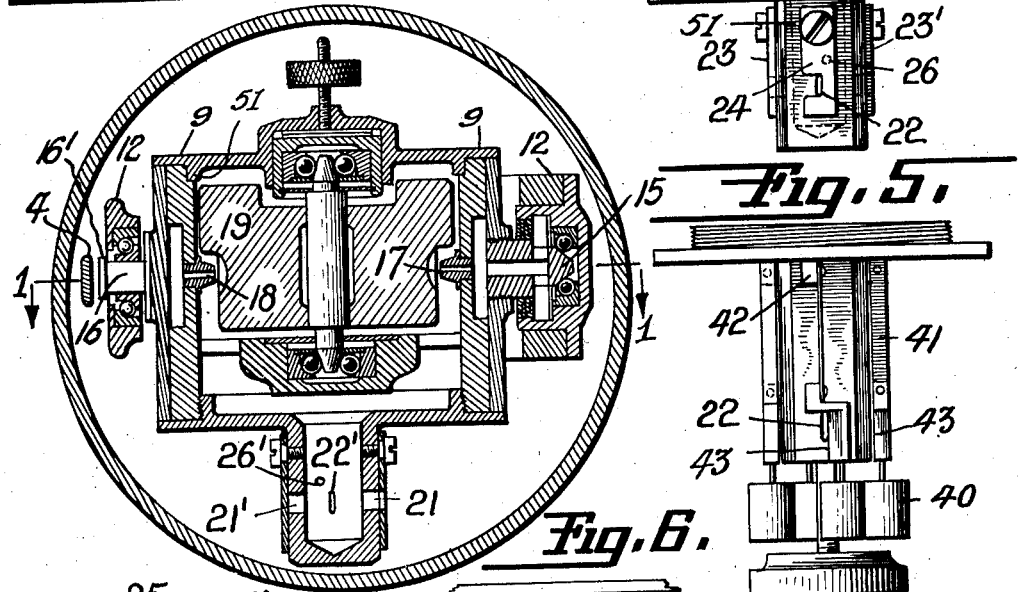
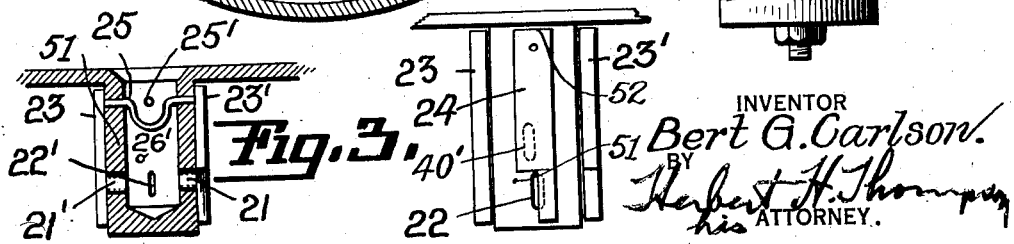
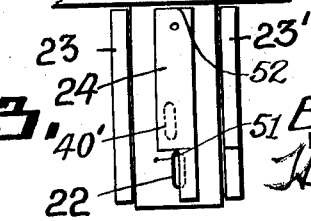
INVENTOR
Bert G. Carlson.
BY Herbert H. Thompson
his ATTORNEY.

Dec. 4, 1934. B. G. CARLSON 1,982,636
AIR DRIVEN GYRO VERTICAL
Filed Feb. 10, 1931 2 Sheets-Sheet 2
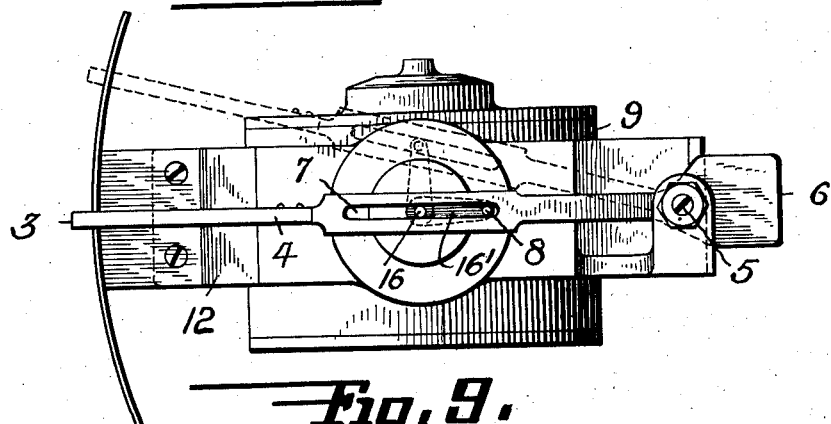
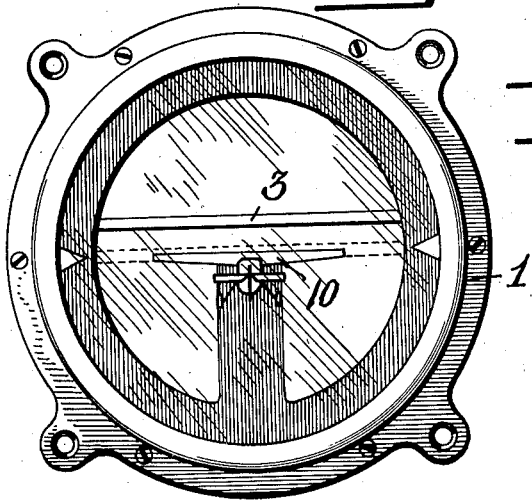
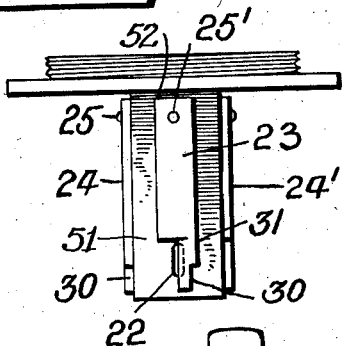
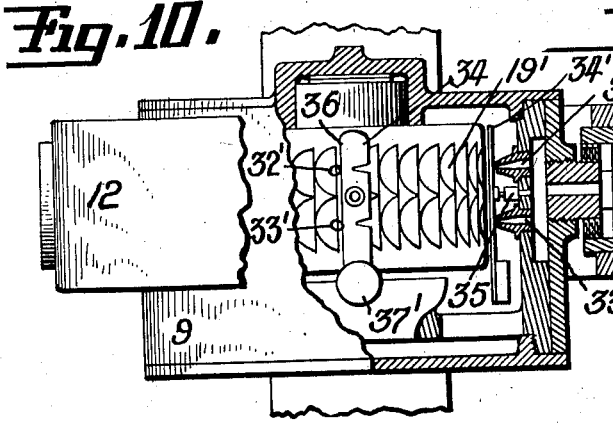
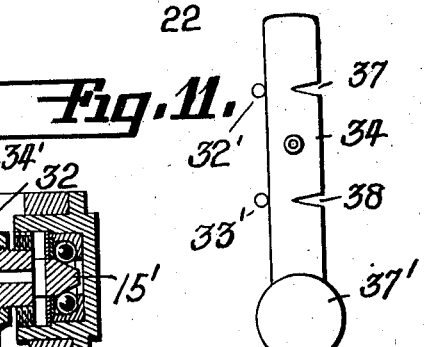
INVENTOR
Bert G. Carlson.
BY
Herbert H. Thompson
ATTORNEY.

Patented Dec. 4, 1934

1,982,636

UNITED STATES PATENT OFFICE 1,982,636

AIR DRIVEN GYRO VERTICAL

Bert G. Carlson, Elmhurst, N. Y., assignor to Sperry Gyroscope Company, Inc., Brooklyn, N. Y., a corporation of New York Application February 10, 1931, Serial No. 514,737

8 Claims. (Cl. 74—5)

This invention relates to gyro verticals or artificial horizons. While of general application, the invention is especially adapted for gyro verticals or artificial horizons for aircraft, where such instruments are useful as indicators to guide the aviator in blind flying and also to furnish a base-line for automatic flight or stabilization of airplanes. Such devices must possess a combination of simplicity, lightness, and accuracy under all conditions of turn, bank, and even during looping. I have found pendulous type gyroscopes unsuited for such uses on account of the fact that during turning or other maneuvering giving rise to acceleration forces, an oscillation of the gyro pendulum is set up which persists for some time. I prefer, therefore, to employ a substantially non-pendulous gyroscope and to impart gravitational control thereto in such a manner as to directly reduce inclination without setting up oscillations. In order to completely accomplish this result, however, I have found that it is necessary to construct the controlling device so that it does not increase proportionately to the tilt, but on the other hand preferably is reduced when the relative tilt between the gyroscope and the controlling device exceeds a predetermined amount. Unless some such means is employed, the gyroscope during turning will be disturbed and tend to assume a position in line with the virtual vertical instead of remaining truly vertical.

By my invention I also have improved the indicating element of gyro verticals so that the aviator may loop-the-loop with the device without disturbing the gyro element.

Referring to the drawings showing several forms of the invention,

Fig. 1 is a horizontal section through my gyro vertical taken on line 1—1 of Fig. 2.

Fig. 2 is a vertical section through the same taken on line 2—2 of Fig. 1.

Fig. 3 is a sectional view of the erecting mechanism of a slightly modified form of the invention shown in Fig. 2.

Fig. 4 is an elevation of the erecting mechanism of either Figs. 2 or 3.

Fig. 5 is a similar view of a modified form of erecting mechanism.

Fig. 6 is a similar view of still another form of erecting device.

Fig. 7 is a similar view of the preferred form of erecting device.

Fig. 8 is a side elevation of the gyro element of my invention showing how the horizon indicator is operated from the gyro.

Fig. 9 is a face view of the instrument.

Fig. 10 is a side elevation, partly in section, of a modified form of the invention in which the erecting and damping action is obtained directly from the air drive itself.

Fig. 11 is a detail of one of the blades or baffle plates.

The gyroscope is shown enclosed within a casing 1 having a front window 2 through which the artificial horizon bar 3 is visible (see Fig. 9). The gyroscope as a whole comprises a rotor 19 spinning about a normally vertical axis within rotor bearing casing 9 which, in turn, is universally mounted within the outer casing by gimbal ring 12. Indicating bar 3 is shown as mounted on a long arm 4 pivoted at 5 on gimbal ring 12 and counter-balanced by a weight 6. A slot 7 is provided therein through which projects a pin 8 or other eccentric mounted to tilt with the rotor bearing casing 9 so that when the said casing tilts with respect to the outer casing 1, or in other words, when the plane tilts around the gyroscope, bar 3 is moved up and down to simulate the apparent movement of the horizon with respect to the miniature plane 10 painted on the glass of the indicator. The gimbal 12 is shown as supported on the major horizontal axis 13—14 in the casing 1 and within said gimbal the rotor bearing casing is pivoted on minor horizontal axis 15—16. Pin 8 is shown as projecting from a crank arm 16' on trunnion 16, the parts assuming the position shown in dotted lines in Fig. 8 when the plane is diving at a steep angle. It should be observed that with this construction not only is the horizon bar moved in the same direction as the real horizon appears to move on pitching of the craft, but also that the pitching movement is magnified near the horizontal position and at the same time decreased for larger angles. In fact, as shown in Fig. 8, the horizon bar cannot be moved to a greater than a predetermined angle determined by the length of the crank arm or eccentric 16', so that the horizon bar preferably never moves out of the field of vision determined by the window 2, regardless of the angle at which the plane is diving. Also, it should be observed that there are no parts to strike, regardless of the angle of dive.

I prefer to drive the gyro wheel or rotor 19 by an air jet or jets 17—18 although it is obvious that it may be driven by any suitable means. In the form shown, a drive of less than atmospheric pressure is employed, the outer casing 1 being continually exhausted of air through pipe connection 20. Air at atmospheric pressure is supplied to the nozzles through screen 21 and channels 22 leading through the gimbal trunnion 14 and thence through a hollow gimbal 12 and through the trunnion 15 into the hollow rotor bearing casing 9 from whence the air escapes through nozzles 17—18 onto the gyro wheel. The entire gyroscope including its casing 9 is preferably substantially balanced about both horizontal axes. A very slight amount of pendulousness may be employed to correct for errors due to friction in the trunnions, but the center of support approaches so nearly the center of gravity that the device has no natural period of oscillation. For maintaining the spinning axis in the vertical, I preferably make use of the reaction from the air used to drive the rotor which brings into action upon inclination of said axis a force about an axis preferably at right angles to the axis of inclination to directly eliminate the tilt.

In the forms of the invention shown in Figs. 1 to 7 I utilize the said air after it has been employed to drive the rotor. For this purpose the air is allowed to escape from the rotor bearing casing through a plurality of main ports 21—21', 22—22' which are directed parallel to each of the gimbal axes in both directions. Said ports are normally at least partially uncovered, and are preferably located in the downward reduced extension 51 from the rotor bearing casing 9, the ports facing in four directions and being symmetrically placed with respect to the vertical spinning axis of the rotor and acting about the gimbal axes. As the control means for the jets I provide a plurality of small light pendulous shutters or blades 23, 23'—24, 24', one of which normally hangs so that an edge thereof lies adjacent or preferably partially covers one port. The two pair of blades or shutters are preferably secured to common pivot shafts 25 and 25' extending at right angles to each other through the downward reduced extension 51 from the casing 9, thus pivoting the blades above their respective jets or ports and between the same and the rotor. Each blade is also preferably flattened at the top 52 to act as a stop against the under side of the casing 9 so that the blades will not be displaced through more than a predetermined angle, thus preventing opposite ports from being wholly uncovered at the same time. This type of shutter has several important advantages over the type shown in the prior art, such as in the patent to Bates No. 1,518,892, Self damping gyro pendulum, dated December 9, 1924. In the prior construction, any wear in the pivotal support of the pendulum would permit it to lower and thus come in contact with the bowl and render the whole device inoperative. With applicant's construction, on the other hand, slight wear in the pivots for the little shutters is immaterial and merely gives them greater play. In addition, the airjets emerging through the ports 21, 21', 22 and 22' act to hold the blades away from the gyro casing and thus keep them free. In the prior art construction, on the other hand, the air pressure tended to force the pendulum toward the bowl and caused contact on the slightest wear of the pivot. In addition, the little pendulums are so light that they do not change materially the center of gravity of the gyroscope as a whole no matter what position the blades may assume, i. e., whether they are hanging vertical or whether one or more has swung over to its limiting position. In the prior art construction, on the other hand, a sharp bank of the plane would cause the controlling pendulum to swing over against the fixed stop and since the pendulum in this case was comparatively heavy the center of gravity of the system was changed resulting in setting up oscillations. As long as all pendulums are vertical the amount of air issuing from each port is equal so that there is no reaction on the gyroscope. Upon relative inclination of the gyroscope and the pendulums, for instance in a clockwise direction in Fig. 4, it will readily be seen that port 22 will be completely uncovered by blade 24 while the opposite port 22' will be covered by the opposite blade. There will, therefore, be exerted a torque about gimbal axis 15—16 of the gyroscope brought about by inclination of the gyroscope about axis 13—14. For accurate work, I prefer to so design the blades and/or ports that the erecting torque exerted under excessive relative inclination of the blades is reduced or at least prevented from increasing as compared to the torque exerted by normal tilt of the blades. As explained above, in a device of this character it is desirable to have a maximum erecting torque for a small tilt so as to quickly restore the gyroscope to the vertical by direct reduction of tilt. During continued turns, however, or acceleration, the blades are continuously held at relatively large inclination so that under such circumstances the erecting torque if proportional to the tilt of the blades during such time would cause the gyroscope to assume an undesirable tilt. To overcome this difficulty I have shown in Figs. 2, 3, and 4 four auxiliary ports 26—26' placed a short distance from the opposite edge of the blades from the main ports. Under the conditions assumed above, therefore, after the port 22 is uncovered, the auxiliary port 26 on the opposite side will become uncovered, said auxiliary port being of less area than port 22. Thus it will be seen that the effective torque is reduced for large tilts and, therefore, the disturbing effect on the gyro greatly reduced without interfering with the more powerful erecting force which comes into action as soon as the tilt begins. The action for the other blades is similar.

The form of blade which I prefer at present is shown in Fig. 7. According to this form only one aperture 22 need be employed on each side. The blade is so shaped that upon excessive inclination, for instance, in a clockwise direction, in Fig. 7, a portion of the port 22' on the opposite side from port 22 will be uncovered when the cut-away portion 30 of the blade behind blade 24 lies over said port. It should be noted that said cut-away portion will uncover first only about one half of the port 22 so that the counter-torque is less than the primary torque. If still further inclination occurs, the straight edge portion 31 of said blade uncovers the port so that the effective erecting torque is substantially eliminated, but preferably the upper surface 52 of the blade comes into contact with the under surface of the casing 9 before this happens so that the erecting force is never entirely lost.

Instead of using air after it has been used to drive the wheel, I may employ the direct reaction of the driving jets for imparting an erecting torque. Such a form of the invention is shown in Fig. 10. According to this figure a plurality of superimposed jets 32—33 and 32'—33' are employed about at least one, and preferably two axes of the gyroscope. The jets of each pair are preferably situated an equal distance above and below respectively of the center of support of the gyroscope, in other words, equi-distant above and below the gimbal axes. Corresponding elongated or dual buckets or blades 19' are provided in the gyro wheel. Between the jets and gyro wheel I mount a pendulous element which is shown as in the form of a blade or shutter 34—34', each blade being mounted on a pivot 35 lying in the same horizontal plane as the gimbal axes. One edge 36 of each blade lies adjacent the two jets. The blades are shown as being made pendulous by masses 37' at their lower ends. Preferably each edge is tangential to the circular air streams so that when the gyro is vertical neither jet strikes the blade. Upon inclination of the gyro, however, it will readily be seen that one jet or the other will be more or less intercepted. That portion of the jet striking the blade gives a much greater reaction in a horizontal direction than when it engages the rapidly revolving gyro wheel. There will, therefore, result a torque about the horizontal axis of the gyroscope at right angles to the axis of inclination which is the desired result. Opposite inclination will obviously intercept the other jet and result in a torque in the opposite direction.

In order to reduce this torque for more than predetermined inclination, I have shown V-shaped notches 37—38 in the opposite edge of each blade. Said notches at their inner ends are of much less area than the area of the air streams so that only a portion of said air stream is able to get past the blade while the remaining portion reacts against the blade. As the blade swings further, however, the amount of air getting through the notch progressively increases so that the erecting or damping force progressively diminishes. By having two pendulums 90° apart, I am able to apply an erecting torque about either axis of the gyroscope, depending on the axis of inclination.

The modification shown in Fig. 5 illustrates the use as pendulums of weights 40 supported by flat springs 41 riveted to fixed blocks 42 at their upper ends, the knife edges being shown at 43 to cooperate with slots 22. The flat springs 41 are made fairly flexible so as not to interfere with the movements of the pendulous weights, the springs acting mainly as a pivotal support for the weights.

In Fig. 6 auxiliary apertures 40' are placed above the main apertures 21—22 and at a somewhat further distance from the active edge of the blade. On a slight inclination, therefore, only the aperture 22, for instance, is uncovered, but upon a greater inclination the aperture 40' is also uncovered. This has the effect of reducing the torque about the horizontal axis because the air then escapes more freely and at less velocity than when only one aperture is uncovered. This form of the invention, as well as the form shown in Figs. 2 to 4, also has the effect of tending to accelerate the gyro wheel when excessive inclinations occur. A change of speed of the wheel at this time is also of advantage since it varies the gyroscopic reaction and period and tends to prevent the setting up of an oscillation.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use. Thus my invention also has application to the pendulous type of gyro vertical, the erecting device then being usually referred to as a damper, since the primary force is exerted by gravity on the pendulous factor of the gyroscope.

Having described my invention, what I claim and desire to secure by Letters Patent is:

1. In a gyroscopic artificial horizon, a gyro-rotor and rotor bearing casing, means for supporting the same for oscillation about horizontal axes in substantially neutral equilibrium and with the rotor having a normally vertical spin axis, and gravitationally responsive means for maintaining said spin axis erect without imparting pendulosity to the casing, including a plurality of pairs of opposed jets adapted to exert erecting torques on said casing about either of said horizontal axes, and a plurality of small pendulums pivoted on said casing, one of said pendulums being adjacent each of said jets for altering the relative strength of said torques about either one of said axes upon relative inclination of said means and said casing about the other of said axes.

2. A gyroscopic artificial horizon as claimed in claim 1, in which said jets are narrow vertical slots whereby said pendulums bring a maximum erecting torque into action upon a relatively small tilt of said casing and means.

3. In a gyroscopic artificial horizon, a gyro-rotor and rotor bearing casing, means for supporting the same for oscillation about horizontal axes in substantially neutral equilibrium and with the rotor having a normally vertical spin axis, and gravitationally responsive means for maintaining said spin axis erect without imparting pendulosity to the casing, including a plurality of pairs of opposed jets adapted to exert erecting torques on said casing about either of said horizontal axes, and a plurality of small pendulums pivoted on said casing, one of said pendulums being adjacent each of said jets for altering the relative strength of said torques about either one of said axes upon relative inclination of said means and said casing about the other of said axes, the said jets being narrow vertical slots whereby said pendulums bring a maximum erecting torque into action upon a relatively small tilt of said casing and means, and auxiliary jets to exert counteracting torques to said erecting torques whereby the erecting torque is diminished upon large relative inclinations of said casing and means.

4. In a gyro vertical for aircraft, a gyroscope including means for supporting the same on horizontal axes in substantially neutral equilibrium and with its rotor having a normally vertical spinning axis, a plurality of pairs of pendulous blades pivoted on the gyroscope on horizontal axes at an angle to each other, and differential air ports adjacent said blades and controlled thereby, the air from which is adapted to exert a torque on a part of the gyroscope at an angle to the angle of relative inclination between the same and said blades whereby the rotor axis is directly restored to the vertical.

5. In a gyro vertical for aircraft, a gyroscope including means for universally supporting the same on horizontal axes in substantially neutral equilibrium and with its rotor having a normally vertical spinning axis, an air jet for spinning the rotor, a downward extending hollow member carried by said gyroscope having vertically extending narrow slots therein facing in four directions and through which the spinning air normally escapes, a pendulous shutter pivoted adjacent each slot and adapted to close the same on relative tilting of said shutter and hollow member in one direction only whereby, upon such tilting taking place, at least one of said slots will be closed more than the opposite slot causing a torque on the gyroscope at right angles to the direction of tilt and in a direction to directly restore the rotor axis to the vertical.

6. In a gyro vertical for aircraft, a gyroscope including means for supporting the same on horizontal axes in substantially neutral equilibrium and with the rotor leaving a normally vertical spinning axis, a plurality of pairs of pendulous blades pivoted on said gyroscope on horizontal axes at an angle to one another, and a plurality of pairs of opposite air jets from which air normally escapes equally in different directions, each pair of blades normally equally covering a pair of opposed jets whereby, on relative inclination of the gyroscope and one pair of blades, one jet is closed more than the other creating an unbalanced escape of air and consequent reactive torque at an angle to the axis of tilt.

7. In a gyro vertical for aircraft, a gyroscope including a gyro casing, means for universally supporting the same on horizontal axes in substantially neutral equilibrium and a rotor in said casing having a normally vertical spinning axis, an air port for spinning the rotor thereof, vertically extending narrow slots in the gyro casing facing in four directions and through which the spinning air normally escapes, a pendulous shutter pivoted outside of each slot and adapted to close the same on relative tilting of said shutter and casing in one direction only whereby, upon such tilting taking place, at least one of said slots will be closed more than the opposite slot causing a torque on the casing at right angles to the direction of tilt and in a direction to directly restore the rotor axis to the vertical.

8. In a gyro vertical for aircraft, a gyroscope including a gyro casing, means for universally supporting the same on horizontal axes in substantially neutral equilibrium and a rotor in said casing having a normally vertical spinning axis, an air port for spinning the rotor thereof, vertically extending, oppositely directed narrow slots in the gyro casing adapted to discharge air streams in the general direction of said supporting axes and through which the spinning air normally escapes, a pendulous shutter pivoted outside of each slot and means oppositely connecting said shutters in pairs whereby each shutter is adapted to close the adjacent slot on relative tilting of said shutter and casing in one direction only, the opposite shutter being adapted to close the opposite slot on relative tilting in the opposite direction, whereby, upon such tilting taking place, at least one of said slots will be closed more than the opposite slot causing a torque on the casing at right angles to the direction of tilt and in a direction to directly restore the rotor axis to the vertical.

BERT G. CARLSON.